(12) United States Patent
Osaki (10) Patent No.: US 10,066,659 B2
(45) Date of Patent: Sep. 4, 2018

(54) HOOK

(71) Applicant: Sugatsune Kogyo Co., Ltd., Tokyo (JP)

(72) Inventor: Masahiro Osaki, Tokyo (JP)

(73) Assignee: SUGATSUNE KOGYO CO., LTD., Chiyoda-ku (JP)

( * ) Notice: Subject to any disclaimer, the term of this patent is extended or adjusted under 35 U.S.C. 154(b) by 0 days.

(21) Appl. No.: 14/769,416

(22) PCT Filed: Feb. 17, 2014

(86) PCT No.: PCT/JP2014/053619
§ 371 (c)(1),
(2) Date: Nov. 23, 2015

(87) PCT Pub. No.: WO2014/129422
PCT Pub. Date: Aug. 28, 2014

(65) Prior Publication Data
US 2016/0108953 A1    Apr. 21, 2016

(30) Foreign Application Priority Data

Feb. 20, 2013   (JP) .................................. 2013-030656

(51) Int. Cl.
*A47G 25/06*   (2006.01)
*A47G 29/08*   (2006.01)
(Continued)

(52) U.S. Cl.
CPC .............. *F16B 45/00* (2013.01); *A47G 25/06* (2013.01); *A47G 25/0607* (2013.01);
(Continued)

(58) Field of Classification Search
CPC .......... F16B 45/00; F16B 45/04; F16B 45/02; F16M 13/02; A47G 29/08; A47G 25/06
(Continued)

(56) References Cited

U.S. PATENT DOCUMENTS 1,386,894 A * 8/1921 Myrmo .................... B66C 1/36
                                                      24/599.2
1,398,654 A * 11/1921 Sarup ...................... B66C 1/36
                                                      24/600.2
(Continued)

FOREIGN PATENT DOCUMENTS

CH        389205 A    9/1960
DE       1160596 B    5/1961
(Continued)

OTHER PUBLICATIONS

WIPO, Japanese International Search Authority, International Search Report dated Mar. 25, 2014 in International Patent Application No. PCT/JP2014/053619, 5 pages.
(Continued)

*Primary Examiner* — Muhammad Ijaz
(74) *Attorney, Agent, or Firm* — Masuvalley & Partners

(57) ABSTRACT

Provided is a hook which is capable of holding multiple objects or an object having a large size of width by efficiently using a space inside the hook, reliably preventing the hanged object from dropping, and allowing the hanged object to be taken out easily.

A hook body has a latch that locks an arm biased toward an outside of the hook body by an arm biasing mechanism, and regulates a displacement of the arm, thereby closing an opening portion. While the latch is biased by a latch biasing mechanism so as to face the opening portion and be present at an arm regulating position for locking the arm, the latch is displaced from the arm regulating position against a biasing force of the latch biasing mechanism so as to unlock the arm.

3 Claims, 8 Drawing Sheets

(51) Int. Cl.
*F16B 45/04* (2006.01)
*F16B 45/00* (2006.01)
*F16B 45/02* (2006.01)
*F16M 13/02* (2006.01)

(52) U.S. Cl.
CPC .............. *A47G 29/08* (2013.01); *F16B 45/02* (2013.01); *F16B 45/04* (2013.01); *F16M 13/02* (2013.01)

(58) Field of Classification Search
USPC .... 248/617, 100, 294.1, 322, 304–306, 339, 248/551, 552, 914; 294/82.2, 82.21, 294/82.31; 24/599.1, 599.2, 599.4, 599.5, 24/599, 6, 600.1, 600.2
See application file for complete search history.

(56) References Cited

U.S. PATENT DOCUMENTS

| | | | | |
|---|---|---|---|---|
| 1,442,101 | A * | 1/1923 | Smith | F16B 45/02 24/599.1 |
| 1,508,705 | A | 9/1924 | Mahan | |
| 1,790,056 | A * | 1/1931 | Moody | E21B 19/04 24/599.5 |
| 1,879,168 | A * | 9/1932 | Freysinger | F16B 45/02 24/599.7 |
| 3,317,972 | A * | 5/1967 | Harley | B64D 17/30 220/2.1 A |
| D244,585 | S * | 6/1977 | Jonsson | D8/367 |
| 4,039,220 | A * | 8/1977 | Stoops | B66C 1/36 24/600.1 |
| 4,062,092 | A * | 12/1977 | Tamada | F16B 45/02 24/599.4 |
| 4,122,585 | A * | 10/1978 | Sharp | B66C 1/36 24/599.5 |
| 4,152,814 | A * | 5/1979 | Ito | F16B 45/02 24/599.3 |
| 4,539,732 | A * | 9/1985 | Wolner | B66C 1/36 24/600.2 |
| 4,977,647 | A * | 12/1990 | Casebolt | B66C 1/36 24/599.5 |
| 5,664,304 | A * | 9/1997 | Tambornino | B66C 1/36 24/370 |
| 5,735,025 | A * | 4/1998 | Bailey | F16B 45/02 24/600.1 |
| 5,820,181 | A * | 10/1998 | Le Noach | B63B 21/54 294/82.19 |
| 5,832,571 | A * | 11/1998 | Kanamori | A44C 5/2038 24/599.6 |
| 6,206,209 | B1 | 3/2001 | Houg-Brown | |
| 6,421,888 | B1 * | 7/2002 | Grenga | F16B 45/02 24/598.9 |
| 6,772,488 | B1 * | 8/2004 | Jensen | F16B 45/02 24/598.6 |
| 8,308,125 | B2 * | 11/2012 | Losaw | F16B 45/02 248/339 |
| 9,175,717 | B2 * | 11/2015 | Tardif | F16B 45/02 |
| 2002/0050032 | A1 * | 5/2002 | Carnall | F16B 45/02 24/600.2 |
| 2004/0025309 | A1 * | 2/2004 | Loe | F16B 45/02 24/600.1 |
| 2005/0109904 | A1 * | 5/2005 | Diggle, III | F16B 45/02 248/304 |
| 2005/0193531 | A1 * | 9/2005 | Chang | F16B 45/02 24/600.2 |
| 2005/0193533 | A1 * | 9/2005 | Chang | F16B 45/02 24/601.4 |
| 2008/0222859 | A1 * | 9/2008 | Chepurny | F16B 45/02 24/599.2 |
| 2013/0160252 | A1 * | 6/2013 | Lin | F16B 45/02 24/601.5 |
| 2015/0329330 | A1 * | 11/2015 | Rytkonen | B66C 1/36 294/82.2 |

FOREIGN PATENT DOCUMENTS

| | | |
|---|---|---|
| DE | 17 75 402 A1 | 5/1971 |
| FR | 984070 A | 7/1951 |
| FR | 1291420 A | 3/1962 |
| GB | 920392 A | 3/1963 |
| GB | 2 387 617 A | 10/2003 |
| JP | S38-14232 B1 | 8/1963 |
| JP | 1984-50976 U | 4/1984 |
| JP | 1992-110578 U | 9/1992 |
| JP | 2010-88255 A | 4/2010 |

OTHER PUBLICATIONS

The Hague, Supplementary European Search Report issued in EP Application No. EP 14 75 3505, dated Oct. 18, 2016, total 6 pages.

* cited by examiner

HOOK

RELATED APPLICATIONS

This application is the U.S. National Phase of and claims priority to International Patent Application No. PCT/JP2014/053619, International Filing Date Feb. 17, 2014, entitled Hook; which claims benefit of Japanese Application No. JP2013-030656 filed Feb. 20, 2013; both of which are incorporated herein by reference in their entireties.

TECHNICAL FIELD

The present invention pertains to an improved hook which is to be put on a wall and the like and to hang and hold an object such as a shoulder strap or an handle of a bag. Especially, the present invention pertains to a hook which is able to reliably prevent an object from dropping and use a space inside the hook effectively.

BACKGROUND

For example, a hook put on a wall can be used to hook an elongated object such as a shoulder strap or a handle of a bag for hanging the bag and the like. The hook holds and hangs the object which is inserted within a hook body through an opening portion. In this case, an arm for closing the opening portion may be provided to prevent the hanged object from slipping from the hook and dropping. (For example, refer to Patent Document 1.)

Figure 8A:
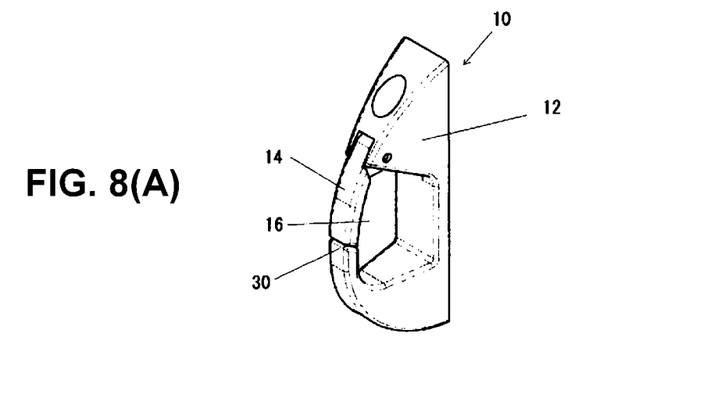
FIG. 8(A) is a perspective view of the hook.
Figure 8B:
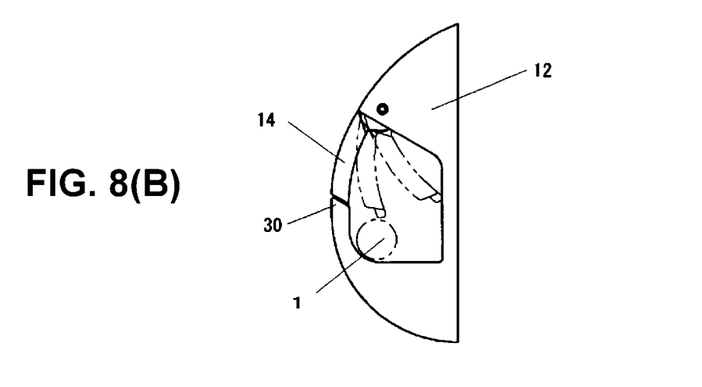
FIG. 8(B) is a side view of the hook.
Figure 8C:
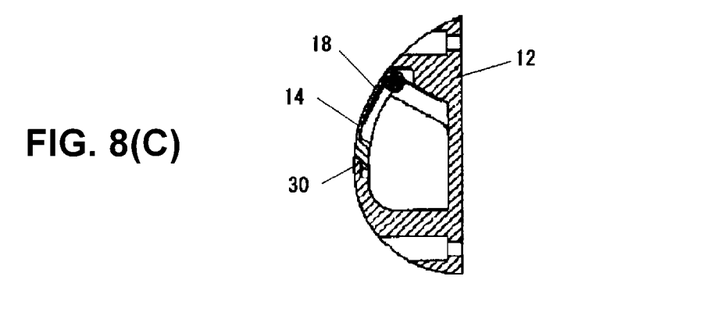
FIG. 8(C) is a longitudinal sectional view of the hook.

As shown in FIGS. 8(A)-8(C), such an arm 14 is usually biased by an arm biasing means 18 so as to be displaced toward an outside of a hook body 12, while the displacement is regulated by a stopper 30 provided at a tip of the hook body 12, thereby having a function of preventing an inserted object 1 from dropping by closing an opening portion 16 of the hook body 12. On the other hand, the arm 14 opens the opening portion 16 and allows the object 1 to be inserted into the hook body 12 when the object 1 to be hanged is pressed toward the arm 14 so that the arm 14, as shown in FIGS. 8(A)-8(C), is pressed into the hook body 12 against a biasing force of an arm biasing means 18.

In this situation, conventionally, as shown in FIGS. 8(A)-8(C), the arm 14 was only able to be displaced toward the inside of the hook body 12 because the stopper 30 blocked the arm 14 from displacing toward the outside of the hook body 12. As a result of this, in the case where the object 1 is not present or a few objects are present inside the hook body 12, or the object 1 has a small size of width as shown in FIG. 8(B), the arm 14 was able to be freely displaced inside the hook body 12, and reliably close the opening portion 16 and prevent the object 1 from dropping. However, especially in the case where multiple objects 1 were hanged or the object 1 had a large size of width, since the object 1 was inserted into the hook body 12 while being pressed to the arm 14, the arm 14 which has been pressed by the object 1 stayed inside the hook body 12 and was not able to return to its original closing position. Consequently, the opening portion 16 remained open. Accordingly, in the case where multiple objects or the object 1 having a large size of width, which were both especially desired not to be dropped, were hanged, there was a problem that the object was not reliably prevented from dropping.

Meanwhile, if the prevention of the object 1 from dropping by closing the opening portion 16 by the arm 14 is given priority by ensuring the displacement of the arm 14, the number of the objects 1 to be hooked on the hook 10 will be limited. As a result of this, there occurs a problem that the holding space inside the hook body 12 cannot be efficiently used. That is, the conventional hook 10 had to ensure a space inside the hook body 12 to maintain the displacement of the arm 14 for reliably preventing the object 1 from dropping with using the arm 14. Consequently, there was a dead space inside the hook body 12.

Also, the arm 14 of the conventional hook 10 was only able to swing toward the inside of the hook body 12. For this reason, in order to take out the object 1 hanged on the hook body 12, the arm 14 was pressed into the inside of the hook body 12 so as to open the opening portion 16, and the object 1 had to be taken out while keeping the state where the arm 14 remained pressed. This operation was troublesome.

PRIOR ART DOCUMENTS

Patent Documents

Patent Document 1: Registered Design Publication No. 1320516

SUMMARY OF THE INVENTION

Problems to be Solved by the Invention

The problem to be solved by the present invention is, in view of the problems above, to provide a hook which can hold multiple objects or an object having a large size of width by efficiently using a space inside the hook, also reliably prevent the hanged object from dropping, and allow the hanged object to be easily taken out.

Means for Solving the Problems

As the first means for solving the problems mentioned above, the present invention is to provide a hook including:
a hook body having an opening portion for hanging an object which is inserted through the opening portion on, the hook body having a front receiving portion for preventing the object hanged within the hook body from dropping forward; and
an arm for closing the opening portion of the hook body, the arm being biased by an arm biasing means so as to be displaced toward an outside of the hook body, and closing the opening portion by the displacement of the arm being regulated, while opening the opening portion and allowing the object to be inserted into the hook body when the arm is pressed into the hook body against a biasing force of the arm biasing means;
wherein the hook body has a latch for closing the opening portion by regulating the displacement of the arm by locking the arm which is biased by the arm biasing means,
the latch is biased by a latch biasing means such that the latch is present at an arm regulating position for locking the arm, and
when the latch is displaced from the arm regulating position against a biasing force of the latch biasing means, the arm is unlocked and the opening portion is allowed to be released with the arm displaced toward the outside of the hook body by the biasing force of the arm biasing means.

As the second means for solving the problems mentioned above, the present invention is to provide a hook. In the hook as the second means according to the first means described above, from a state where the arm is displaced at the outside of the hook body, when the arm is pressed into the hook body while pressing the latch such that the latch is displaced from the arm regulating position against the biasing force of the latch biasing means, and is then released, the arm is locked by the latch which has returned to the original arm regulating position by the latch biasing means after being released from the press by the arm, and returns to a position for closing the opening portion.

As the third means for solving the problems mentioned above, the present invention is to provide a hook. In the hook as the third means according to the first means or the second means, the latch is slidably attached to the front receiving portion.

As the forth means for solving the problems mentioned above, the present invention is to provide a hook. In the hook as the forth means according to the first means or the second means, the latch is swingably attached to the front receiving portion.

Effect of the Invention

According to the present invention, as mentioned above, the arm can be displaced toward the outside of the hook body by the arm being unlocked by the latch. Therefore, there are benefits that multiple objects or an object having a large size of width can be inserted and held within the hook body without the necessity of displacing the arm excessively into the hook body, and that the hanged object can be easily taken out.

Meanwhile, according to the present invention, as described above, when the arm which has been displaced at the outside of the hook body is pressed down, the latch is pressed down at the same time. After the latch is released from the contact with the arm, the latch returns to its original position, and also the arm easily returns to a normal state for closing the opening portion. Therefore, there is a benefit that even after multiple objects or an object having a large size of width are inserted, the opening portion can be properly closed and the inserted objects can be reliably prevented from dropping. Also, there is a benefit that the arm can easily return to the original state after the objects are taken out from the hook body.

In this case, according to the present invention, as described above, since the latch is slidably provided at the front receiving portion which is positioned at the front side of the hook body, there are benefits that the latch can be easily operated, and that the displacement of the arm can be controlled without disfiguring the appearance of the hook.

Also, according to the present invention, as described above, since the latch is swingably provided at the front receiving portion which is positioned at the front side of the hook body, there are benefits that the latch can be easily operated, and that the displacement of the arm can be easily controlled.

BRIEF DESCRIPTION OF THE DRAWINGS

FIGS. 3(A)-3(G) show a hook of the present invention.

FIGS. 7(A)-7(C) show another example of a hook of the present invention.

FIGS. 8(A)-8(C) show a conventional hook.

DESCRIPTION OF THE PREFERRED EMBODIMENT

Figure 1A:
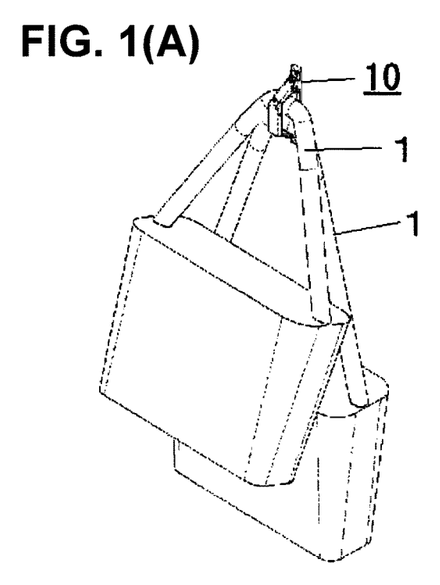
FIGS. 1(A) and 1(B) are perspective views of a hook of the present invention on which a bag has been hanged.
Figure 1B:
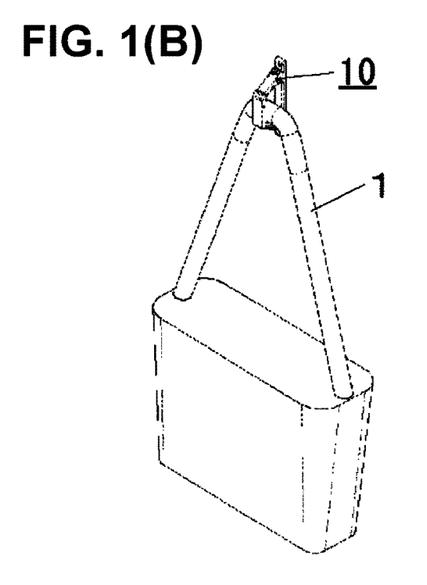

Embodiments for implementing the present invention are described with referring to the figures. FIGS. 1(A)-1(B) and 5(A)-5(F) show a hook 10 of the present invention, and as shown in FIGS. 1(A)-1(B), the hook 10 is put on a wall and the like and used to hang and hold especially an elongated object 1 such as a shoulder strap or an handle of a bag. The object 1 to be hanged is not especially limited to any as long as the object 1 can be hanged on the hook 10, and for example, a hanger not shown and the like are cited as the object 1. The hook 10, as shown in FIGS. 2(A)-2(D) through 5(A)-5(F), is provided with a hook body 12 for hanging the object 1 on, and an arm 14.

1. Hook Body

As shown in FIGS. 2(A)-2(D) through 5(A)-5(F), the hook body 12 is provided with an attaching portion 12A for being attached on a wall and the like, a hanging portion 12B for hanging and supporting the object 1 to be hanged from below, and a front receiving portion 12C for preventing the object 1 hanged within the book body 12 from dropping forward. There is an opening portion 16 between the attaching portion 12A and the front receiving portion 12C. The hook body 12, as especially shown in FIGS. 3(A)-3(G) and 5(A)-5(F), hangs on the object 1 which is inserted into the hook body 12 through the opening portion 16.

However, the shape of the hook body 12 is not especially limited to any. Especially, the front receiving portion 12C is not limited to those in which a tip of the receiving portion 12C is formed so as to extend upward as the embodiments shown in figures. For example, the front receiving portion 12C may be formed so as to extend upward obliquely, for example, having its longitudinal sectional shape as an almost V-shape. In this point, similarly, it is not necessary for the hook body 12 to have the hanging portion 12B for receiving the object 1 as long as the hook body 12 has at least the attaching portion 12A and the front receiving portion 12C and can hang the object 1 on. It is possible to have an embodiment in which the object 1 is received by the attaching portion 12A and the front receiving portion 12C.

2. Arm

Meanwhile, the arm 14, as shown in FIGS. 1(A)-1(B) through 5(A)-5(F), is positioned so as to extend from the upper end side of the attaching portion 12A for closing the opening portion 16, and is swingably attached to the attaching portion 12A. The arm 14, as shown in FIGS. 2(A)-2(D)

and 5(A)-5(F), can swing against the attaching portion 12A of the hook body 12. Especially, as shown in FIGS. 2(A), 3(A), 4, and 5(A), when the arm 14 is positioned across the opening portion 16 of the hook body 12, the arm 14 can close the opening portion 16. By this, as shown in FIGS. 1(A)-1(B) and 3(A), the object 1 inserted into the hook body 12 can be prevented from dropping from the hook 10.

The arm 14, as shown in FIGS. 2(A)-2(D), 3(A)-3(G) and 5(A)-5(F), is biased by an arm biasing means 18 so as to be usually displaced toward an outside of the hook body 12. As a result of this, the arm 14, as shown in FIGS. 2(C) and 5(D), is set to be positioned at the outside of the hook body 12 when the arm 14 is in a free state.

As the arm biasing means 18, a torsion spring (a torsion coil spring) 18A having an arm portion can be used as shown in, for example, FIGS. 2(A)-2(D), 3(A)-3(G) and 5(A)-5(F). With one arm portion of the torsion spring 18A being engaged with the attaching portion 12A of the hook body 12 and the other arm portion of the torsion spring 18A being engaged with the inner side of the arm 14, the arm 14 is biased so as to be displaced toward the outside of the hook body 12 by a restoring force of the torsion spring 18A. As a result of this, the torsion spring 18A as the arm biasing means 18, as especially shown in FIG. 5(D), is usually set to be a shape in which the both arms are arranged almost linearly.

The arm 14, as shown in FIGS. 2(A)-2(D) through 5(A)-5(F), closes the opening portion 16 by the displacement of the arm 14 being regulated by a latch 20 of the hook body 12, which is described later. In this case, as especially shown in FIG. 4, a tip of the arm 14 has a locking portion 14a which can be locked by a tip of the latch 20 which is positioned for facing the opening portion 16. With the locking portion 14a, as shown in FIG. 3(A), being engaged with the latch 20 from below and being locked by the latch 20, the displacement of the arm 14 toward the outside of the hook body 12 is regulated and the opening portion 16 is closed. Accordingly, the object 1 held within the hook body 12 can be prevented from dropping.

Figure 2A:
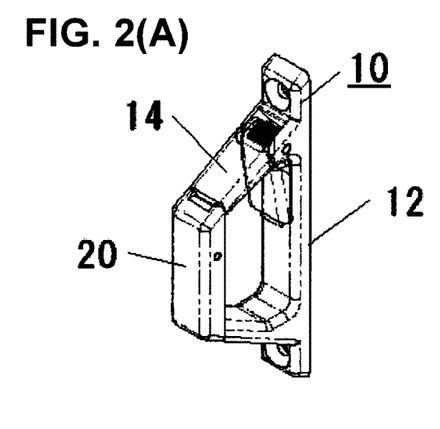
FIGS. 2(A)-2(D) are perspective views of a hook of the present invention.
Figure 2B:
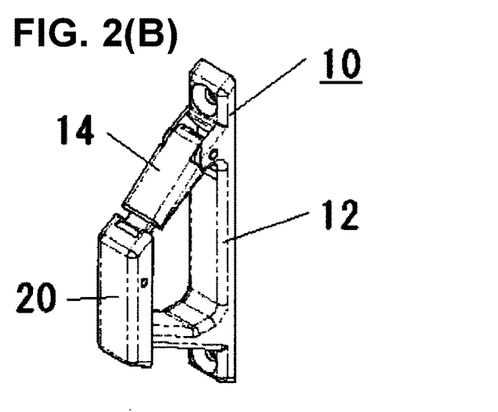
Figure 2C:
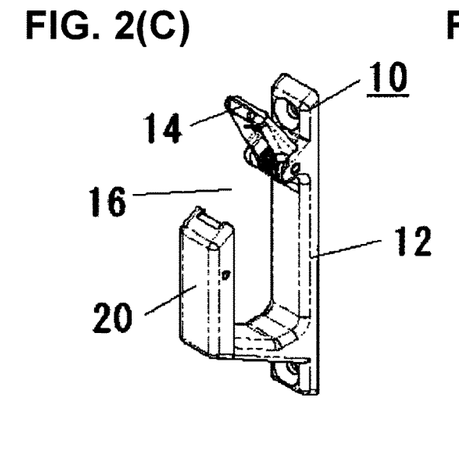
Figure 2D:
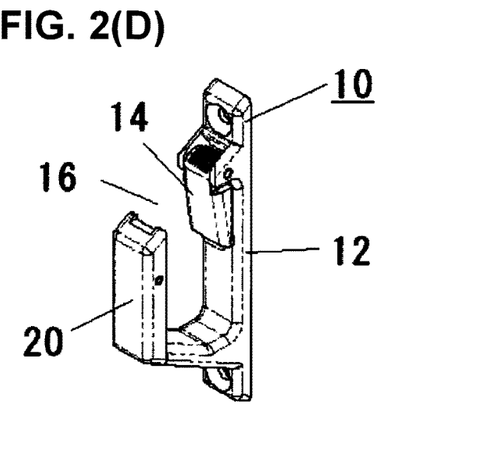
Figures 3A, 3B, 3C, 3D, 3E, 3G:
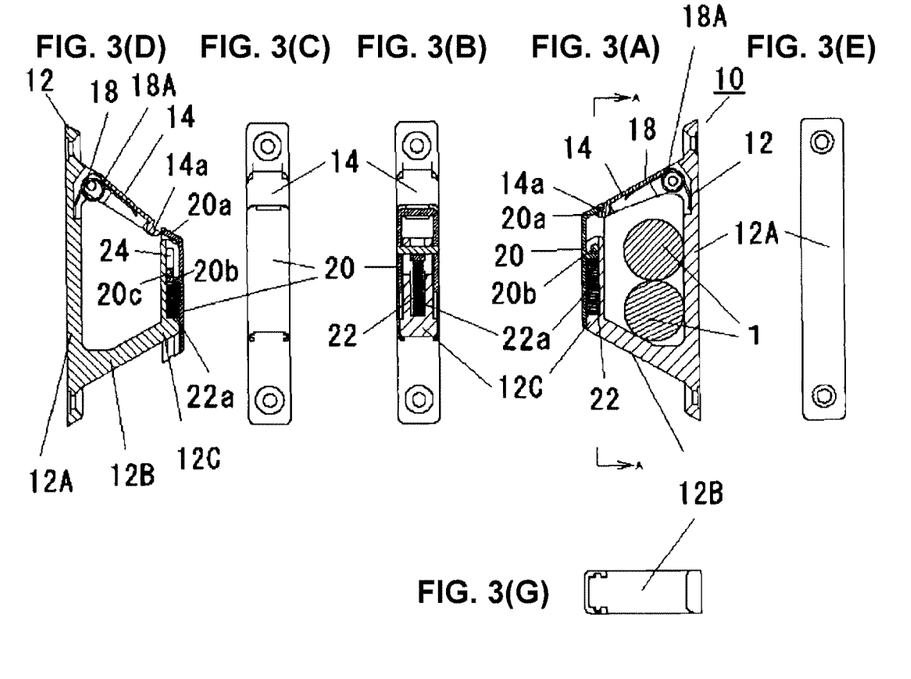
FIG. 3(A) is a longitudinal sectional view of the hook seen from the right side.
FIG. 3(B) is a sectional view taken along the line A-A of FIG. 3(A).
FIG. 3(C) is a front view of the hook.
FIG. 3(D) is a longitudinal sectional view of the hook seen from the left side.
FIG. 3(E) is a back view of the hook.
FIG. 3(G) is a bottom view of the hook.
Figure 3F:
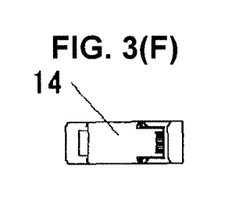
FIG. 3(F) is a plane view of the hook.
Figures 5A, 5B:
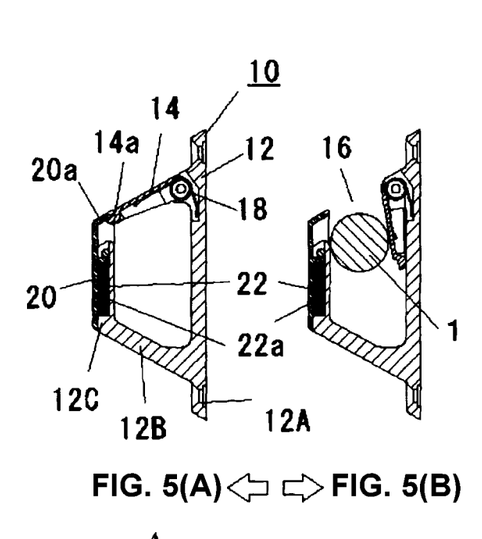
FIGS. 5(A)-5(F) are longitudinal sectional views showing a state where a hook of the present invention is operated.

Meanwhile, as shown in FIGS. 2(A), 2(D), and 5(B), when the arm 14 is pressed into the hook body 12 against a biasing force of the torsion spring 18A as the arm biasing means 18, the arm 14 opens the opening portion 16 and allows the object 1 to be inserted into the hook body 12. As shown especially in FIG. 5(B), by only pressing the object 1 to be hanged on the hook 10 to the arm 14 from above, the arm 14 swings into the hook body 12 and the object 1 can be hanged by the hook body 12.

3. Latch

Figure 4:
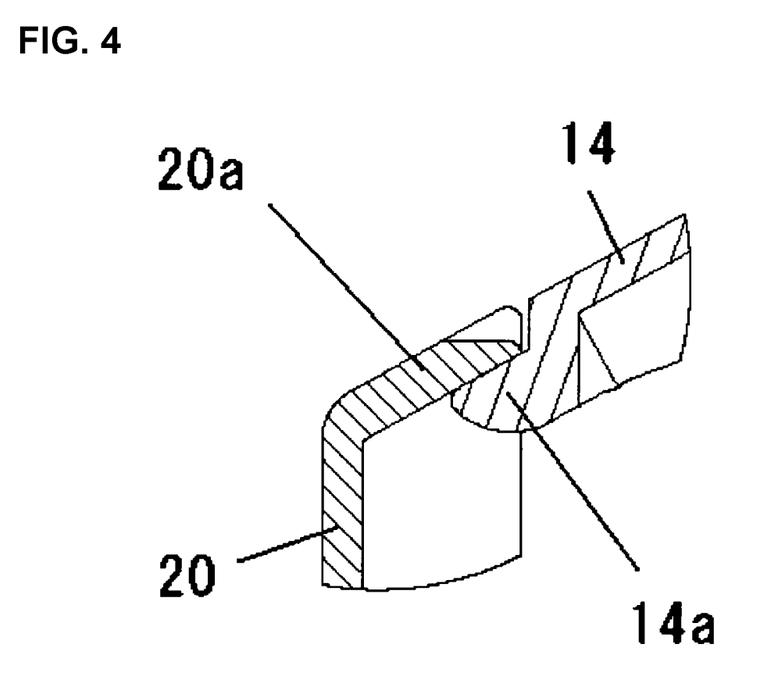
FIG. 4 is an enlarged sectional view of a tip portion of a latch and a selected part of an arm which are both used for a hook of the present invention.

In the present invention, the hook body 12, as shown in FIGS. 1(A)-1(B) through 5(A)-5(F), has a latch 20 for closing the opening portion 16 by regulating the displacement of the arm 14 by locking the arm 14 which is biased by the arm biasing means 18. The latch 20, as shown in FIGS. 3 through 5, has, at its tip end, a stopper portion 20a protruding toward the opening portion 16. The stopper portion 20a extends to an arm regulating position which is on the swinging locus of the arm 14, and can engage with the locking portion 14a of the arm 14. That is, the latch 20, as shown in FIG. 4, usually functions as a stopper for the arm 14 with using the stopper portion 20a.

The latch 20, as shown in FIGS. 3(A)-3(G) and 5(A)-5(F), is attached to the front receiving portion 12C of the hook body 12 and can be displaced against the front receiving portion 12C. Specifically, the latch 20, as shown in FIGS. 3(A) and 5(A), is biased (upward in the embodiments shown in FIGS. 1(A)-1(B) through 5(A)-5(F) by a latch biasing means 22 such that the latch 20 faces the opening portion 16 and is present at the arm regulating position for locking the arm 14. Therefore, when the latch 20 is in a free state, as shown in FIGS. 3(A), 4, and 5(A), the latch 20 is displaced upward and is present at a position (the arm regulating position) which is above the front receiving portion 12C and where the latch 20 can lock the locking portion 14a of the arm 14, thereby functioning as a stopper for the arm 14.

Figure 5C:
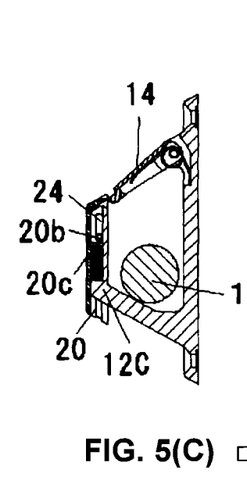
Figures 5D, 5E:
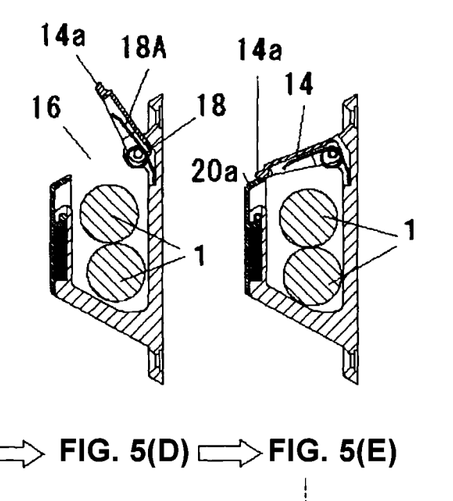
Figure 5F:
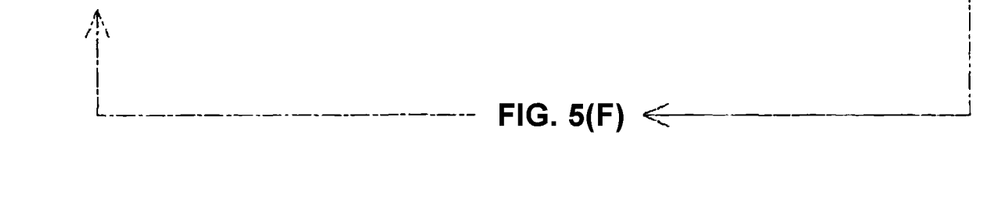

Meanwhile, as shown in FIGS. 3(D) and 5(C), when the latch 20 is displaced (downward in the embodiments shown in FIGS. 1(A)-1(B) through 5(A)-5(F) from the arm regulating position against a biasing force of the latch biasing means 22, the arm 14 is unlocked and, as shown in FIGS. 5(D) and 5(E), the opening portion 16 is allowed to be released with the arm 14 being displaced toward the outside of the hook body 12 by a biasing force of the torsion spring 18A as the arm biasing means 18.

In this case, the latch 20 can be slidably attached to the front receiving portion 12C of the hook body 12. Specifically, in the embodiments shown in FIGS. 1(A)-1(B) through 5(A)-5(F), as shown especially in FIGS. 3(D) and 5(C), the latch 20 has a sliding shaft 20b which can slide in a long hole 24 formed in the front receiving portion 12C. With the sliding shaft 20b sliding inside the long hole 24 of the front receiving portion 12C, the latch 20 can be slidably displaced against the front receiving portion 12C (Slide type).

In the embodiments shown in FIGS. 1(A)-1(B) through 5(A)-5(F), as shown in FIGS. 3(A)-3(G) and 5(A)-5(F), a coil spring (a compression coil spring) 22a is used as the latch biasing means 22. The coil spring 22a is provided inside the front receiving portion 12C. The lower end of the coil spring 22a is supported by the front receiving portion 12C, while the upper end of the coil spring 22a is contacted with a spring holder 20c from below. The coil spring 22a has a natural length which is longer than the long hole 24 of the front receiving portion 12C. Usually, the coil spring 22a, as shown in FIGS. 3(A) and 5(A), biases the sliding shaft 20b of the latch 20 so as to position the sliding shaft 20b at the topmost portion of the long hole 24. Accordingly, the latch 20 advances to the arm regulating position, and the displacement of the arm 14 can be regulated by the stopper portion 20a of the latch 20 locking the locking portion 14a of the arm 14.

As shown in FIGS. 3(D) and 5(C), when the latch 20 is pressed downward with compressing the coil spring 22a and the sliding shaft 20b is pressed down toward the lower part of the long hole 24, at the same time, the stopper portion 20a at the tip end of the latch 20 presses the locking portion 14a of the arm 14 downward, allowing the arm 14 to slightly swing toward the inside of the hook body 12. Eventually, when the stopper portion 20a is out of the swinging locus of the arm 14, as shown in FIGS. 2(c) and 5(D), the arm 14 becomes a free state by being released from the regulation by the latch 20. By a biasing force of the torsion spring 18A as the arm biasing means 18, the arm 14 is displaced toward the outside of the hook body 12 and allows the opening portion 16 to be open.

For this reason, by only pressing the latch 20 downward, the arm 14 is displaced toward the outside of the hook body 12, thereby easily opening the opening portion 16. As a result of this, without the necessity of excessively displacing the arm 14 into the hook body 12, it can be possible to insert and hold multiple objects 1 or an object 1 having a large size of width within the hook body 12, as well as it can be possible to easily take out the hanged object 1 by easily opening the opening portion when the object 1 needs to be taken out. That is, the hook 10 of the present invention is beneficial for solving a dead space because the hook 10 not only can displace the arm 14 toward the inside of the hook body 12, but also can displace the arm 14 toward the outside of the hook body 12 so as to open the opening portion 16.

Also, after the arm 14 is displaced at the outside of the hook body 12, by pressing the arm 14 into the hook body 12, the arm 14 can be easily returned to an original state for closing the opening portion 16 due to the latch 20. Specifically, when the arm 14 is pressed downward as shown in FIG. 5(E), from a state where the arm 14 is displaced at the outside of the hook body 12 as shown in FIG. 5(D), the locking portion 14a is engaged with the latch 20 from above, which is present at a usual position (a position biased upward) due to the latch biasing means 22. That is, when the arm 14 is positioned at the outside of the hook body 12, the latch 20 is, on the arm 14 locus, present at a position for blocking the arm 14 from swinging into the hook body 12, by contraries.

From this state, if the arm 14 is pressed further, while pressing the latch 20 downward further from the arm regulating position against a biasing force of the latch biasing means 22, the arm 14, itself, is pressed into the hook body 12 at the same time. Then, when the stopper portion 20a of the latch 20 is off the swinging locus of the arm 14, the latch 20 is released from the press by the arm 14 and returns to the original arm regulating position for regulating the arm 14. Also, the arm 14 returns to a free state again. By stopping pressing the arm 14 downward, the arm 14 is biased upward by the torsion spring 18A as the arm biasing means 18, and the locking portion 20a of the arm 14 is again engaged with and locked from below by the stopper portion 20a of the latch 20, thereby the arm 14 returning to an original position for closing the opening portion 16 as shown in FIGS. 3(A) and 5(A).

In this way, by only pressing down the arm 14 which has been displaced at the outside of the hook body 12, the latch 20 is also pressed down. When the latch 20 is released from the contact with the arm 14, the latch 20 returns to the original position and the arm 14 easily returns to a usual state for closing the opening portion 16. Therefore, even after multiple objects 1 or an object 1 having a large size of width is inserted, it is possible to reliably prevent the inserted object 1 from dropping by closing the opening portion 16 properly. Also, after taking the object 1 out of the hook body 12, the arm 14 can easily return to its original state.

4. Use State

Next, the use state of the hook 10 of the present invention is explained with referring to FIGS. 5(A)-5(F). In order to insert and hang the object 1 within the hook body 12, from a usual position of the hook 10 shown in FIG. 5(A), the arm 14 is pressed into the hook body 12 by the object 1 as shown in FIG. 5(B), and the object 1 is inserted within the hook body 12 through the opening portion 16. Then, after the arm 14 is released from the press by the object 1, the arm 14 returns to a state in FIG. 5(A) due to a biasing force of the torsion spring 18A as the arm biasing means 18, thereby closing the opening portion 16 to prevent the object 1 from dropping.

In this situation, especially, if multiple objects 1 are to be hanged on the hook body 12 or the object 1 has a large size of width so as to almost fill in the space within the hook body 12, the latch 20 is pressed down so as to unlock the arm 14 as shown in FIG. 5(C), and the opening portion 16 is released by displacing the arm 14 toward the outside of the hook body 12 as shown in FIG. 5(D), thereby allowing the multiple objects 1 or the object 1 having a large size of width to be inserted into the hook body 12. That is, the hook 10 of the present invention can open the opening portion 16 and allow the object 1 to be inserted by being able to displace the arm 14 toward both of the inside and the outside of the hook body 12. Therefore, without ensuring an additional space inside the hook body 12 for allowing the arm 14 to swing, the object 1 can be inserted. It is possible to use a space efficiently depending on the amount and the size of the object 1 to be inserted.

Then, as shown in FIG. 5(E), by returning the arm 14 to a position for closing the opening portion 16 again, the opening portion 16 will be closed, thereby preventing the object 1 hanged on the hook body 12 from dropping from the hook body 12. Incidentally, the operations shown in FIGS. 5(C) through 5(E) also correspond to a situation for taking out the hanged object 1 from the hook body 12. It is possible to realize a smooth removing of the object 1.

5. Another Embodiment

Further, another embodiment of the present invention is explained with referring to FIGS. 6 and 7. In this embodiment, a latch 20 is different from the latch 20 which is slidably attached to the hook body 12 in the embodiments shown in FIGS. 1(A)-1(B) through 5(A)-5(F). As shown in FIGS. 6(A)-6(G), the latch 20 is swingably attached to the front receiving portion 12C of the hook body 12.

In this embodiment, the latch 20 has a switch-like shape, and the center portion of the latch 20 is swingably attached to the front receiving portion 12c of the hook body 12 through a swinging shaft 20d. Also, in this embodiment, as the latch biasing means 22, a torsion spring 22b having an arm portion and being wound around the swinging shaft 20d can be used. The torsion spring 22b as the latch biasing means 22, as especially shown in FIGS. 6(E) and 6(F), biases the latch 20 such that the latch 20 faces the opening portion 16 and is present at the arm regulating position for locking the arm 14 (such that the latch 20 is displaced toward the opening portion 16 in the embodiments shown in FIGS. 6(A)-6(G) and 7(A)-7(C)). Therefore, the latch 20, as shown in FIGS. 6(A)-6(G), swings toward the opening portion 16 by a biasing force of the latch biasing means 22 and regulates the swing movement of the arm 14 with using the stopper portion 20a, thereby closing the opening portion 16.

Figure 6A:
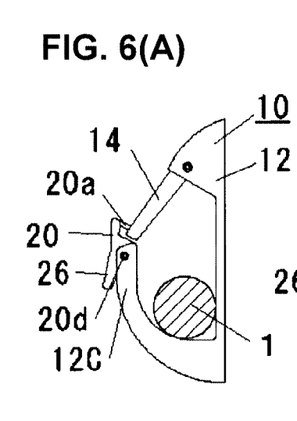
FIGS. 6(A)-6(G) are side views and a sectional view of another example of a hook of the present invention.
Figure 6B:
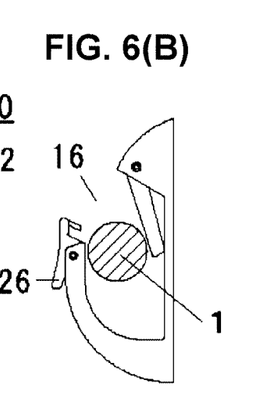
Figure 6C:
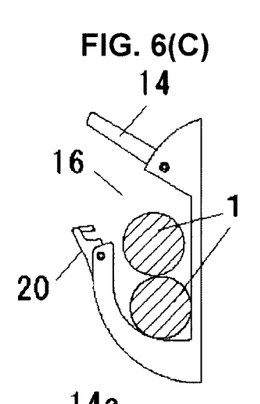
Figure 6D:
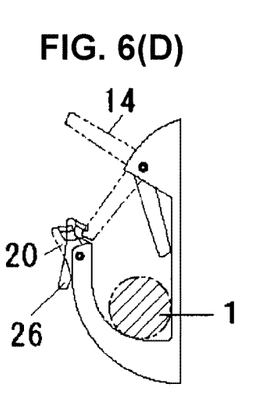
Figures 6E, 6F:
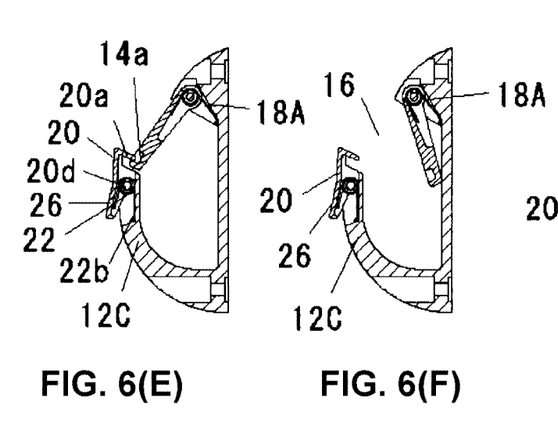
Figure 6G:
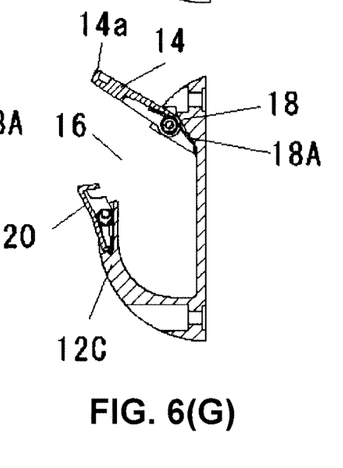
Figure 7A:
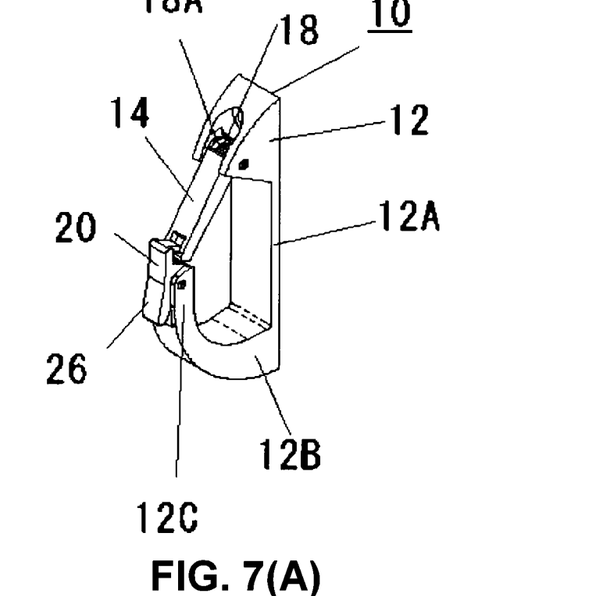
FIG. 7(A) is a perspective view of the hook.
Figure 7B:
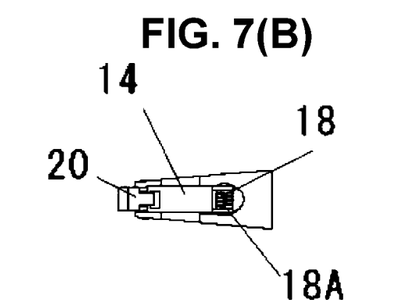
FIG. 7(B) is a plane view of the hook.
Figure 7C:
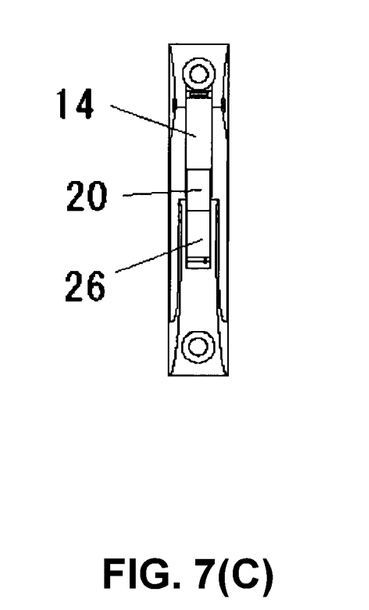
FIG. 7(C) is a front view of the hook.

Meanwhile, the latch 20, as shown in FIG. 6(G), is displaced from the arm regulating position against the torsion spring 22b force as the latch biasing means 22 so as to move away from the opening portion 16, thereby unlocking the arm 14 and allowing the arm 14 to be displaced toward the outside of the hook body 12. As a result of this, the opening portion 16 is allowed to be opened.

Also, in the embodiments shown in FIGS. 6(A)-6(G) and 7(A)-7(C), the lower portion of the switch-shaped latch 20 can function as a lever 26 to make the latch 20 move away from the opening portion 16. That is, by only pressing the lever 26, the latch 20 moves away from the opening portion 16, and by which the regulation of the arm 14 by the latch 20 is released and the arm 14 can be displaced toward the outside of the hook body 12. Accordingly, with such an extremely easy operation, the arm 14 is displaced toward the outside of the hook body 12 and the holding space inside the hook body 12 is efficiently ensured, thereby realizing hanging multiple objects 1 or an object 1 having a large size of width. At the same time, it becomes possible to smoothly take out the object 1 from the hook body 12 by easily opening the opening portion 16. Incidentally, the lever 26 can also be provided at the side or the front and the like of the latch 20 in the embodiments shown in FIGS. 1(A)-1(B) through 5(A)-5(F).

Incidentally, in the embodiments shown in FIGS. 1(A)-1(B) through 5(A)-5(F), since the latch 20 is slidably attached to the front receiving portion 12C which is positioned at the front side of the hook body 12, there are beneficial points that the latch 20 is easily operated, and without disfiguring the appearance of the hook 10, the displacement of the arm 14 can be easily regulated. Also, in the embodiments shown in FIGS. 6(A)-6(G) and 7(A)-7(C), since the latch 20 is swingably attached to the front receiving portion 12C which is positioned at the front side of the hook body 12, there are beneficial points that the latch 20 is easily operated and the displacement of the arm 14 can be easily regulated.

INDUSTRIAL APPLICABILITY

The present invention is available for hanging and holding a bag and the like by being attached to especially, for example, a wall and the like. In addition, the present invention can be widely available for hanging other objects.

REFERENCE NUMERALS 10 hook
12 hook body
12A attaching portion
12B hanging portion
12C front receiving portion
14 arm
14a locking portion
16 opening portion
18 arm biasing means
18A torsion spring
20 latch
20a stopper portion
20b sliding shaft
20c spring holder
20d swinging shaft
22 latch biasing means
22a coil spring
22b torsion spring
24 long hole
26 lever

The invention claimed is:
1. A hook comprising:
a hook body having an opening portion for hanging an object which is configured to be inserted through the opening portion on, the hook body having a front receiving portion for preventing the object configured to be hanged within the hook body from dropping forward; and
an arm that is biased via an arm biasing means to a position toward an outside of the hook body to thereby close the opening portion of the hook body, and is further moveable against a biasing force of the arm biasing means to move the arm away from the outside of the hook to open the opening portion so as to allow the object to be inserted into the hook body;
wherein the hook body has a latch for closing the opening portion by regulating the displacement of the arm by locking the arm which is biased by the arm biasing means,
wherein the latch slidably covers two sides of the front receiving portion in an upward and downward direction of the front receiving portion,
wherein the latch is biased by a latch biasing means such that the latch is displaced upward of the front receiving portion and present at an arm regulating position for locking the arm,
wherein the arm is locked by the latch and the opening portion is closed by the arm when the latch is present at the arm regulating position, and
wherein the arm is unlocked and the opening portion is allowed to be released with the arm displaced toward the outside of the hook body by the biasing force of the arm biasing means when the latch is displaced from the arm regulating position to downward of the front receiving portion against a biasing force of the latch biasing means,
wherein the latch has a stopper portion protruding toward the opening portion, an undersurface of the stopper portion locks a locking portion of the arm,
wherein the stopper portion is located above an upper end of the front receiving portion, and when the stopper portion is pushed downward against the biasing force of the latch biasing means, the stopper portion is displaced close to the upper end of the front receiving portion to broaden the opening portion,
wherein the arm is configured to displace from the outside of the hook body into the hook body while engaging with a top surface of the stopper portion and pressing the latch such that the latch is displaced from the arm regulating position against the biasing force of the latch biasing means,
wherein the latch is configured to return to the arm regulating position by the latch biasing means after being released from a force applied by the arm,
wherein the arm is configured to engage with the undersurface of the stopper portion which has returned to the arm regulating position
wherein the latch has a sliding member which can slide in a long hole formed in the front receiving portion,
the latch is slidably displaced upward and downward of the front receiving portion by the sliding member sliding in the long hole of the front receiving portion.
2. The hook according to claim 1,
wherein the latch biasing means biases the sliding member of the latch so as to position the sliding member at a topmost portion of the long hole,
wherein the arm is configured to displace toward the outside of the hook body, allowing the opening portion to be released when the latch is pressed downward along the front receiving portion.
3. The hook according to claim 1, wherein, the locking portion of the arm is locked by the undersurface of the stopper portion at a position more towards a front side of the front receiving portion than an opening portion side of the front receiving portion.

* * * * *